United States Patent
Aoki et al.

(10) Patent No.: US 9,087,231 B2
(45) Date of Patent: Jul. 21, 2015

(54) OBJECT DETERMINATION DEVICE

(75) Inventors: Katsuji Aoki, Kanagawa (JP); Cher Keng Heng, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 174 days.

(21) Appl. No.: 14/003,491

(22) PCT Filed: Mar. 9, 2012

(86) PCT No.: PCT/JP2012/001658
§ 371 (c)(1),
(2), (4) Date: Sep. 6, 2013

(87) PCT Pub. No.: WO2012/120904
PCT Pub. Date: Sep. 13, 2012

(65) Prior Publication Data
US 2014/0003728 A1    Jan. 2, 2014

(30) Foreign Application Priority Data
Mar. 10, 2011  (JP) .................................. 2011-053201

(51) Int. Cl.
| | | |
|---|---|---|
| G06K 9/68 | (2006.01) | |
| G06K 9/62 | (2006.01) | |
| G06K 9/00 | (2006.01) | |
| G06K 9/46 | (2006.01) | |

(52) U.S. Cl.
CPC ........ G06K 9/00221 (2013.01); G06K 9/00228 (2013.01); G06K 9/4614 (2013.01)

(58) Field of Classification Search
USPC ......................................... 382/118, 209, 218
See application file for complete search history.

(56) References Cited

U.S. PATENT DOCUMENTS

| | | | | |
|---|---|---|---|---|
| 6,792,135 | B1 * | 9/2004 | Toyama ........................ | 382/118 |
| 6,895,103 | B2 * | 5/2005 | Chen et al. ................... | 382/117 |
| 7,505,621 | B1 * | 3/2009 | Agrawal et al. ............... | 382/159 |
| 7,831,068 | B2 * | 11/2010 | Yano ............................. | 382/117 |
| 8,233,720 | B2 * | 7/2012 | Waragai et al. ............... | 382/205 |
| 8,331,698 | B2 * | 12/2012 | Li ................................. | 382/224 |
| 8,712,112 | B2 * | 4/2014 | Perlin et al. ................... | 382/118 |
| 2009/0116749 | A1 * | 5/2009 | Cristinacce et al. .......... | 382/195 |
| 2009/0226111 | A1 * | 9/2009 | Ida et al. ....................... | 382/266 |

(Continued)

FOREIGN PATENT DOCUMENTS

JP        2006-350645        12/2006

OTHER PUBLICATIONS

Viola et al., "Rapid Object Detection using a Boosted Cascade of Simple Features", IEEE Computer Society Conference on Computer Vision and Pattern Recognition (CVPR), ISSN: 1063-6919, vol. 1, Dec. 2001, pp. 511-518.

(Continued)

*Primary Examiner* — John Strege
(74) *Attorney, Agent, or Firm* — Greenblum & Bernstein, P.L.C.

(57) ABSTRACT

A plurality of block pairs are set by setting two of the rectangular blocks contained in one template as one block pair. A score showing a degree to which a part of an object is included in the template is held based on a relation of a relative level between block luminance values in each of the block pairs set in the template. These processes are carried out for all templates. Based on a sum of the scores of all the templates, and whether the object is included in the image is determined.

3 Claims, 17 Drawing Sheets

(56) References Cited

U.S. PATENT DOCUMENTS

| | | |
|---|---|---|
| 2009/0232403 A1 | 9/2009 | Waragai et al. |
| 2010/0014775 A1* | 1/2010 | Ikeda .......................... 382/274 |
| 2011/0142298 A1* | 6/2011 | Akbarzadeh et al. ........ 382/118 |
| 2011/0229042 A1* | 9/2011 | Iwamoto et al. ............. 382/195 |

OTHER PUBLICATIONS

International Search Report, mailed Apr. 17, 2012, in corresponding International Application No. PCT/JP2012/001658.

\* cited by examiner

FIG. 5

| 1 | – | 1 |
|---|---|---|
| 1 | 0 | 0 |

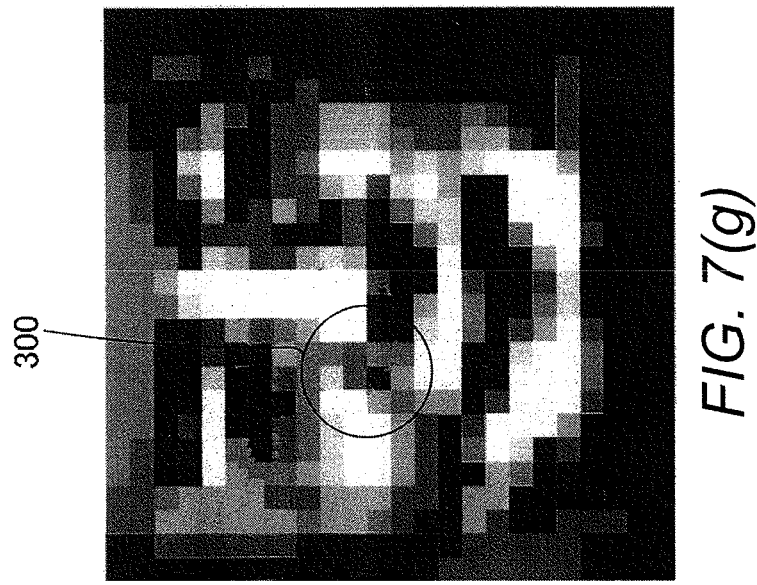
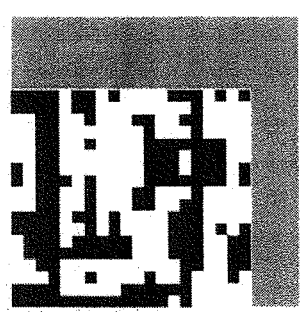
FIG. 7(a)
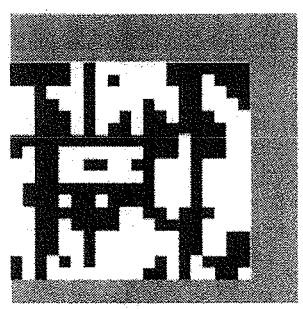
FIG. 7(b)
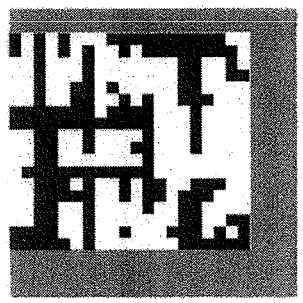
FIG. 7(c)
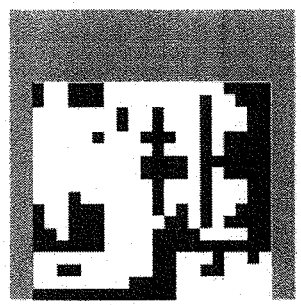
FIG. 7(d)
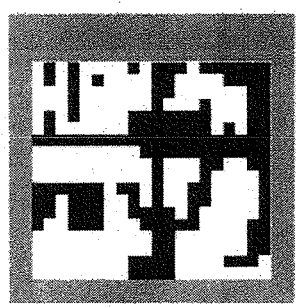
FIG. 7(e)
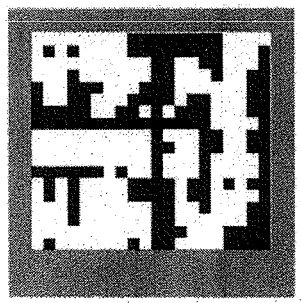
FIG. 7(f)
FIG. 7(g)

FIG. 8(a)   FIG. 8(b)   FIG. 8(c)
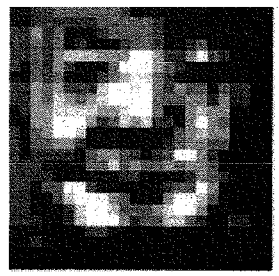 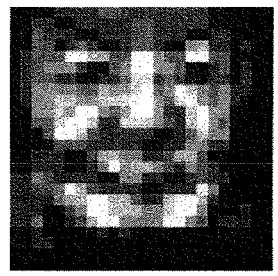 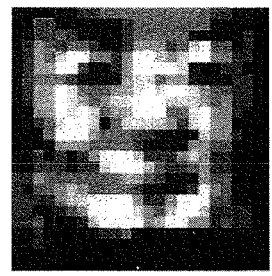
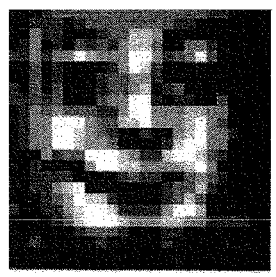 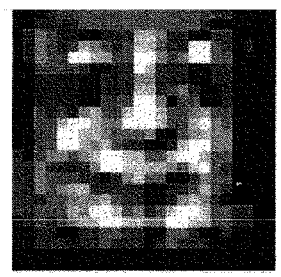 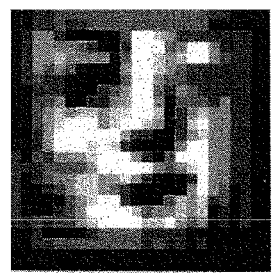
FIG. 8(d)   FIG. 8(e)   FIG. 8(f)

FEATURE PATTERN

- AVERAGE OF BRIGHT BLOCKS = (129+146+122)/3 = 132.33...
- AVERAGE OF DARK BLOCKS = (110+107)/2 = 108.5
- INTENSITY
  = AVERAGE OF BRIGHT BLOCKS - AVERAGE OF DARK BLOCKS
  = 23.833...

FIG. 16
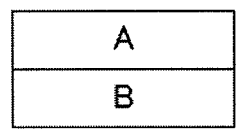
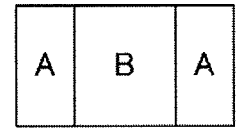

*FIG. 17*

| $A_0$ | $A_1$ | $A_2$ |
|---|---|---|
| $A_3$ | $A_4$ | $A_5$ | us # OBJECT DETERMINATION DEVICE

TECHNICAL FIELD

The present invention relates to an object determination device which determines whether or not an object (for instance, the face of a human being) is included in an image by a pattern recognition based on a statistic learning using a feature amount.

BACKGROUND ART

A device for detecting an object by a statistic learning using a feature amount is disclosed, for instance, in Non-Patent Document 1 or Patent Document 1. The feature amount described in Non-Patent Document 1 is called Haar-like feature amount and obtained by the relation of the relative level of average luminance of pixels in one pair of block areas. FIG. 16 is a diagram for explaining one example (examples 1 and 2) of the feature amount described in Non-Patent Document 1. As shown in FIG. 16, in both the examples 1 and 2, when the relation of the relative level of the average luminance $A_{av}$ and $B_{av}$ of the pixels in the block areas of the one pair of blocks A and B shows a relation of $A_{av} < B_{av}$, the feature amount is set to P=0, and when the relation of the relative level of the average luminance $A_{av}$ and $B_{av}$ shows a relation of $A_{av} \geq B_{av}$, the feature amount is set to P=1.

In the device disclosed in Non-Patent Document, the above-described Haar-like feature amount is used for a face detector to carry out learning by Boosting. The face detector includes a plurality of strong discriminators. Each of the strong discriminators has a high transmission rate to a face image and eliminates a non-face image by a prescribed value. Each of the strong discriminators has a plurality of weak discriminators. Each of the weak discriminators returns a score to the feature amount. The strong discriminator determines a face or a non-face depending on whether or not the total of the scores exceeds a threshold value. Each of the weak discriminators generates the feature amount from an input image of a prescribed size and returns the score for each feature amount to the strong discriminator by using the above-described Boosting learning result.

On the other hand, the feature amount described in Patent Document 1 is obtained by the relation of the relative level between an average luminance of pixels in block areas of all blocks $A_0$ to $A_5$ and an average luminance of pixels in each of the block areas. FIG. 17 is a diagram for explaining one example of the feature amount described in Patent Document 1. As shown in FIG. 17, when the relation of the relative level between the average luminance $A_{ref}$ of the pixels in the block areas of all the blocks $A_0$ to $A_5$ and the average luminance $A_{0av}$ to $A_{5av}$ of the pixels in each of the block areas shows a relation of $A_{iav}$ (i=0 to 5)<$A_{ref}$, the feature amount Pi is set to Pi (i=0 to 5)=0. When the relation of the relative level between the average luminance $A_{ref}$ and the average luminance $A_{0av}$ to $A_{5av}$ shows a relation of $A_{iav}$ (i=0 to 5)$\geq A_{ref}$, the feature amount Pi is set to Pi(i=0 to 5)=1.

RELATED ART DOCUMENTS

Non-Patent Documents

Non-Patent Document 1: Paul Viola and Michael Jones, "Rapid Object Detection using a Boosted Cascade of Simple Features", IEEE Computer Society Conference on Computer Vision and Pattern Recognition (CVPR), in December, 2001, ISSN: 1063-6919, Vol. 1, p. 511-518

Patent Documents

Patent Document 1: JP-A-2006-350645

SUMMARY OF THE INVENTION

Problem to be Solved by the Invention

However, in the technique disclosed in Non-Patent Document 1, since the relation of the relative level of the blocks includes only one pair, a amount of information of a spatial distribution (arrangement) of the luminance is excessively small. Thus, an erroneous decision is liable to be made, for instance, even noise or a character is determined to be the face of a human being. This problem may be improved by using exclusive discriminators (for the face, for noise, for characters or the like). However, when the exclusive discriminators are used, an algorithm is complicated and a cost is high.

In the technique disclosed in Patent Document 1, since a compared reference value (a block $A_{ref}$ as a reference) is the average luminance of the pixels in the areas of all the blocks, the compared reference value is apt to be excessively global. For instance, the size of an ordinarily learned face image (including eyebrows, eyes, a nose and a mouth except a head part) is about 24×24. When the size of each of the block areas of the feature amount of Patent Document 1 shown in FIG. 17 is 2×2 to 4×4, the size of all the block areas is 6×4 to 12×8 to have a global area covering a range ¹⁄₂₄ to ⅙ times as large as the face image. Accordingly, in the average luminance of the pixels in the areas of all the blocks as the compared reference value, features of face parts (the eyes, the nose, the mouth or the like) and a part thereof are hardly left, so that a detection performance for detecting the face and face parts in accordance with these information is not improved. Further, since the size of the areas of all the blocks is large as described above, in the case of a partly hidden face (for instance, a face when one eye is hidden by a cap worn by an object), the areas may include pixel values of the hidden part with high possibility. As a result, the average luminance is liable to receive an influence of the hidden part. Accordingly, the technique of Patent Document 1 is not suitably applied to the detection of the partly hidden face.

The present invention has been made in view of the above-described circumstances, and an object thereof is to provide an object determination device which has a compared reference value that is not excessively global, can largely leave features of parts of the face (eyes, a nose, a mouth or the like) respectively when an object is, for instance, the face of a human being and involves a hidden area with low possibility.

Means for Solving the Problem

An object determination device of the present invention includes: a block luminance calculating unit which sets one or more templates including a plurality of rectangular blocks on an image, and which obtains an average value of luminance of each of the rectangular blocks contained in each template as a block luminance value; a block pair setting unit which sets a plurality of block pairs, by setting two of the rectangular blocks contained in each template as one block pair; a comparing unit which obtains a relation of a relative level between the block luminance values in each of the block pairs; and a score holding unit which holds, for each template, a score showing a degree to which a part of an object is included in the template based on the relation of the relative level between the block luminance values in each of the block pairs set in the template, wherein based on the relation of the relative level between the block luminance values of each of the block pairs in each template, by referring to the score holding unit, a sum of the scores of all the templates is obtained, and whether the object is included in the image is determined based on the sum.

With this configuration, the plurality of block pairs are set by setting two of the plurality of rectangular blocks contained in one template as one bock pair. Based on the relation of the relative level between the block luminance values in each of the block pairs, the score showing a degree to which a part of the object is included in the template is held. The above-described processes are carried out in all the templates, whereby whether the object is included in the image is determined based on the sum of the scores of all the templates. Particularly, in the present invention, any one of the plurality of rectangular blocks included in one template can be set as a compared reference value. Therefore, the size of the area of the compared reference value is smaller (not excessively general) than that of the technique disclosed in Patent Document 1. Accordingly, when the object is, for instance, the face of a human being, the features of parts of the face (eyes, a nose, a mouth or the like) can be respectively largely left. Further, a hidden area is involved with low possibility. Thus, a detection performance for detecting the face and the parts of the face is improved and a partial hiding is well met. The compared reference value may be fixed or non-fixed. When the compared reference value is fixed, for instance, one template is supposed to be formed with the six rectangular blocks $A_0$ to $A_5$, and, for instance, $A_4$ is fixed as the compared reference value. On the other hand, when the compared reference value is non-fixed, for instance, if the rectangular block $A_0$ is compared with the rectangular block $A_3$, the rectangular block $A_3$ may be set as the compared reference value, and when the rectangular block $A_1$ is compared with the rectangular block $A_4$, the rectangular block $A_4$ may be set as the compared reference value.

In the above-described configuration, the rectangular blocks are overlapped with each other.

With this configuration, even when the rectangular blocks are overlapped with each other, if the object is, for instance, the face of the human being, the features of the parts of the face are respectively largely left. Further, the hidden area is involved with low possibility.

In the above-described configuration, the rectangular blocks contact each other.

According to the above-described structure, even when the rectangular blocks contact with each other, if the object is, for instance, the face of the human being, the features of the parts of the face are respectively largely left. Further, the hidden area is involved with low possibility.

Advantages of the Invention

According to the present invention, the compared reference value is not excessively global, the features of parts of the face (the eyes, the nose, the mouth or the like) can be respectively largely left when the object is, for instance, the face of a human being and the hidden area is involved with low possibility.

BRIEF DESCRIPTION OF THE DRAWINGS

FIG. 5 is a diagram showing one example of a feature pattern obtained from a feature amount $P_i$ (i=0 to 5) when the block luminance value of the rectangular block $A_1$ is set as the compared reference value $A_{k[1]av}$ in the object determination device shown in FIG. 1.

FIGS. 7(a) to 7(g) are diagrams showing the feature patterns when the block luminance value of the rectangular block $A_1$ is set as the compared reference value $A_{k[1]av}$ and one example of an average image of the feature pattern when the feature patterns are respectively summed to average them in the object determination device shown in FIG. 1.

FIGS. 8(a) to 8(f) are diagrams for explaining a feature [1] of the present invention and show one examples of the average images of the feature patterns when the block luminance value of the rectangular block $A_1$ is set as the compared reference value $A_{k[1]av}$ (i=0 to 5).

FIG. 16 is a diagram for explaining one example (examples 1 and 2) of a feature amount described in Non-Patent Document 1.

Figure 17:
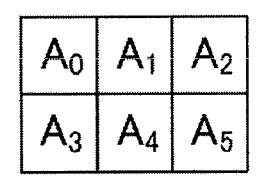

FIG. 17 is a diagram for explaining one example of a feature amount described in Patent Document 1.

MODE FOR CARRYING OUT THE INVENTION

Figure 1:
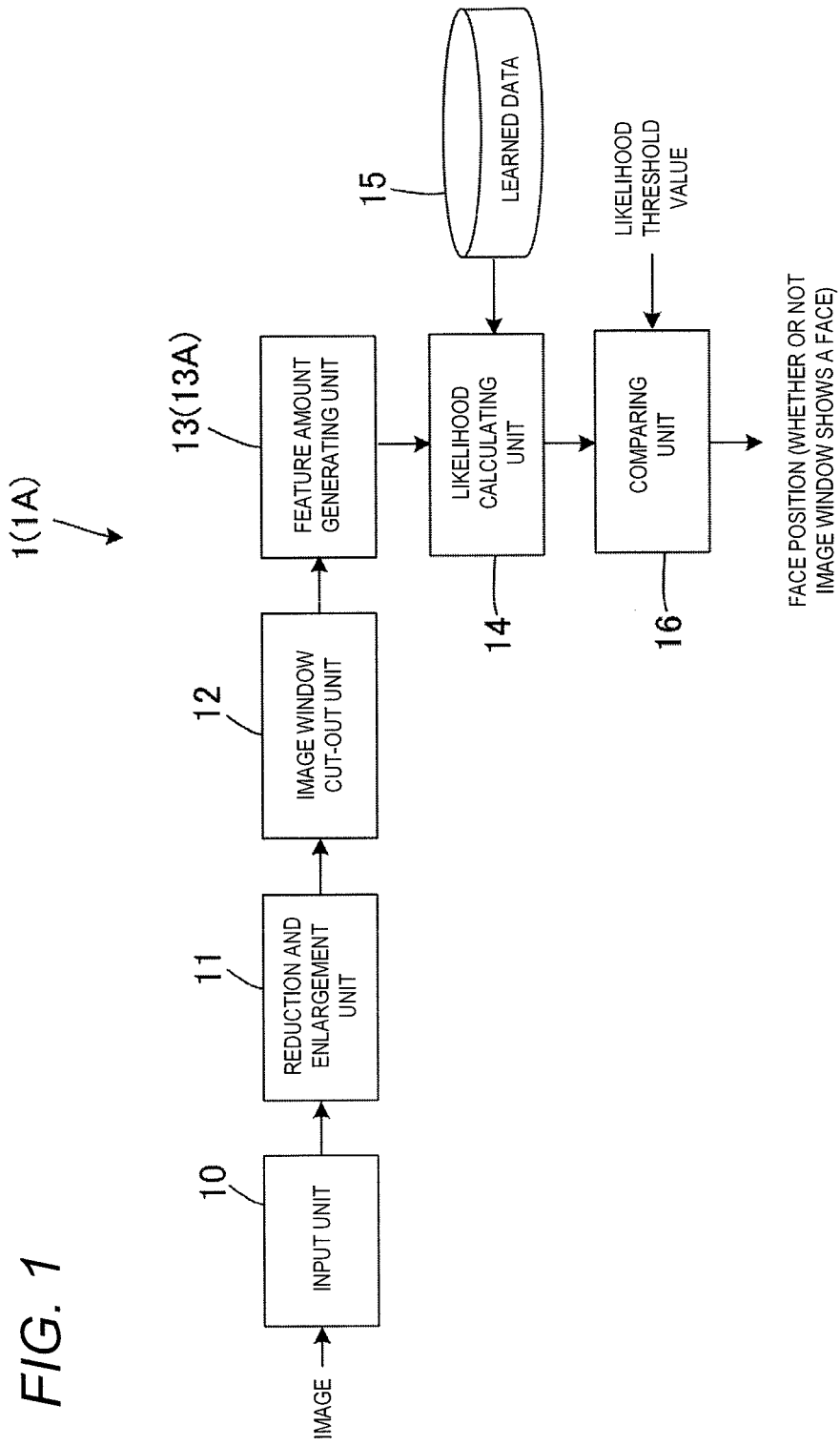
FIG. 1 is a block diagram showing a schematic structure of an object determination device according to a first exemplary embodiment of the present invention.

Now, preferred exemplary embodiments for carrying out the present invention will be described below in detail by referring to the drawings.

First Exemplary Embodiment

FIG. 1 is a block diagram showing a schematic structure of an object determination device according to a first exemplary embodiment of the present invention. In FIG. 1, the object determination device 1 of the first exemplary embodiment includes an input unit 10, a reduction and enlargement unit 11, an image window cut-out unit 12, a feature amount generating unit 13, a likelihood calculating unit 14, a learned data storage unit 15 and a comparing unit 16. The input unit 10 fetches image information obtained by picking up an image by, for instance, a camera. The reduction and enlargement unit 11 carries out a process of a reduction or an enlargement to the image fetched in the input unit 10. The image window cut-out unit 12 cuts out a partial image from the image processed in the reduction and enlargement unit 11. The feature amount generating unit 13 obtains a feature pattern as a feature amount of each template set to the image cut out in the image window cut-out unit 12. A detail of a process carried out by the feature amount generating unit 13 will be described below. In the learned data storage unit 15, learned data of the face of a human being that is previously learned by Boosting is stored. The learned data forms a comparison table of scores to the feature amounts (the feature patterns) of the templates which exist respectively for the templates. The likelihood calculating unit 14 obtains the scores of the templates from the feature amounts (the feature patterns) of the templates respectively in accordance with the learned data to sum the scores of the templates respectively and calculates the likelihood of a touch of the face. The comparing unit 16 compares the likelihood calculated by the likelihood calculating unit 14 with a prescribed likelihood threshold value to output face position information (information as to whether or not the cut-out image is the face).

Figure 2:
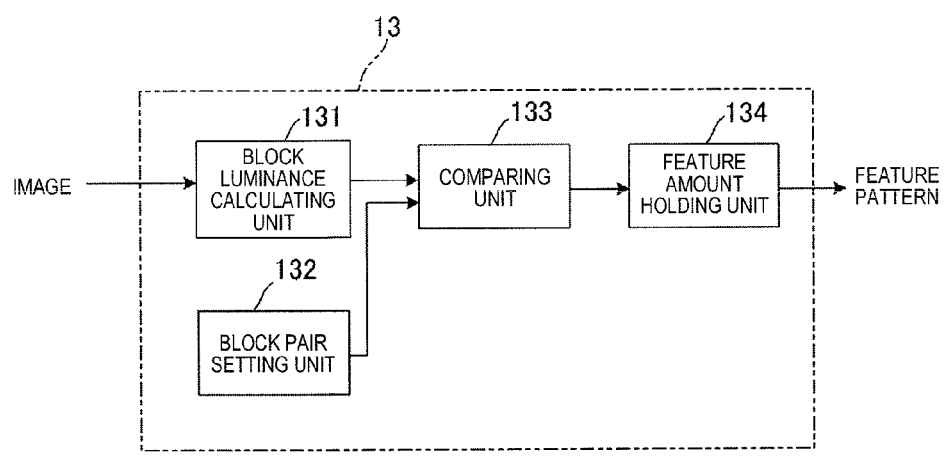
FIG. 2 is a block diagram showing a schematic structure of a feature amount generating unit of the object determination device shown in FIG. 1.
Figure 3A:
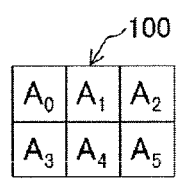
FIGS. 3(a) to 3(c) are diagrams showing one examples of templates set in an image in the object determination device shown in FIG. 1.
Figure 3B:
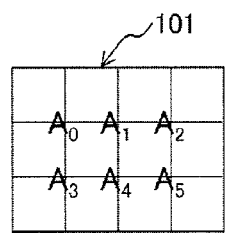
Figure 3C:
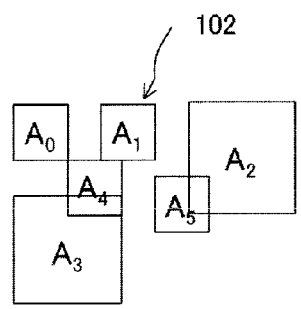

FIG. 2 is a block diagram showing a schematic structure of the above-described feature amount generating unit 13. In FIG. 2, the feature amount generating unit 13 includes a block luminance calculating unit 131, a block pair setting unit 132, a comparing unit 133 and a feature amount holding unit 134. The block luminance calculating unit 131 sets the templates formed with a plurality of rectangular blocks at one to a plurality of positions on the image cut out in the image window cut-out unit 12 to obtain an average value of luminance of the rectangular blocks respectively included in the templates as a block luminance value in each of the templates. Here, FIGS. 3(a) to 3(c) are diagrams showing one examples of the templates. The template 100 shown in FIG. 3(a) is formed with six rectangular blocks $A_0$ to $A_5$ and one rectangular block comes into contact with three other rectangular blocks. The template 101 shown in FIG. 3(b) is formed with the six rectangular blocks $A_0$ to $A_5$ like the template 100 shown in FIG. 3(a), however, one rectangular block comes into contact with three other rectangular blocks so as to be overlapped thereon. The template 102 shown in FIG. 3(c) is formed with the six rectangular blocks $A_0$ to $A_5$ like the template 100 shown in FIG. 3(a), however, the rectangular blocks are respectively irregularly overlapped. For instance, the rectangular block $A_3$ is overlapped on the rectangular block $A_4$, and the rectangular block $A_2$ is overlapped on the rectangular block $A_5$, respectively. Such templates are set on the image cut out in the image window cut-out unit 12.

Returning to FIG. 2, the block pair setting unit 132 sets a plurality of block pairs by setting any two of the rectangular blocks respectively included in the template as one pairs in each of the templates. The comparing unit 133 obtains a relation of a relative level between the block luminance values in each of the block pairs to generate the feature pattern. Then, the feature pattern is held by the feature amount holding unit 134.

The templates shown in FIGS. 3(a) to 3(c) show the one example. The blocks in the templates may be respectively mutually separated, come into mutual contact or may be respectively mutually overlapped. Further, the sizes of the blocks may be respectively the same or different. Further, the number of the blocks in the templates is not limited to 6 as shown in FIGS. 3(a) to 3(c), and the two blocks are set as the one pair so that at least two pair of blocks, namely, three pairs or more of blocks may be provided.

Further, the number of the blocks, arranged positions of the blocks, the sizes of the blocks and combinations of the blocks as one pairs may be the same or different respectively in the plurality of templates. In the templates respectively, the number of the blocks, the arranged positions of the blocks, the sizes of the blocks, the combinations of the blocks as the one pairs and positions of the templates are respectively previously decided by a learning such as Boosting.

In the object determination device 1 of the first exemplary embodiment, any one of the plurality of rectangular blocks forming the template is set as a compared reference value $A_{k[i]av}$ (i=0 to 5) to obtain a feature pattern $P_i$. Here, "av" indicates an average value.

$P_i=0$ ($A_{iav}<A_{k[i]av}$) i=0 to 5
$P_i=1$ ($A_{iav}\geq A_{k[i]av}$) i=0 to 5

The block luminance values of the plurality of rectangular blocks forming the template are calculated in the block luminance calculating unit 131. Then, for instance, when the templates shown in FIGS. 3(a) to 3(c) are used as the template, if the relation of the relative level between the block luminance value $A_{iav}$ (i=0 to 5) of each of the rectangular blocks $A_0$ to $A_5$ and the compared reference value $A_{k[i]av}$ (i=0 to 5) shows a relation of $A_{iav}<A_{k[i]av}$, the feature pattern $P_i$ (i=0 to 5) is "0", and if the relation of the relative level shows a relation of $A_{iav}\geq A_{k[i]av}$, the feature pattern $P_i$ is "1".

Figure 4:
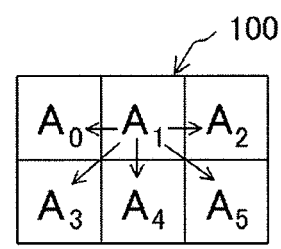
FIG. 4 is a diagram showing an example in which a block luminance value of a rectangular block $A_1$ is fixed as a compared reference value $A_{k[1]av}$ in the object determination device shown in FIG. 1.

Except that the compared reference value $A_{k[i]av}$ is fixed (any one of the rectangular blocks $A_0$ to $A_5$ is decided), the compared reference value $A_{k[i]av}$ may be non-fixed. FIG. 4 is a diagram showing an example in which the template 100 is used and the block luminance value of the rectangular block $A_1$ is fixed as the compared reference value $A_{k[1]av}$. In the example shown in FIG. 4, the block luminance value of the rectangular block $A_1$ fixed as the compared reference value $A_{k[1]av}$ is compared with the block luminance values of the rectangular blocks $A_0$, and $A_2$ to $A_5$ respectively.

On the other hand, when the compared reference value $A_{k[i]av}$ is non-fixed, for instance, the rectangular block $A_0$ is compared with the rectangular block $A_3$. In this case, the block luminance value of the rectangular block $A_0$ is set as the compared reference value $A_{k[0]av}$ to compare the compared reference value $A_{k[0]av}$ with the block luminance value of the rectangular block $A_3$. Further, in comparing the rectangular block $A_1$ with the rectangular block $A_4$, the block luminance value of the rectangular block $A_1$ is set as the compared reference value $A_{k[1]av}$ to compare the compared reference value $A_{k[1]av}$ with the block luminance value of the rectangular block $A_4$. Further, in comparing the rectangular block $A_2$ with the rectangular block $A_5$, the block luminance value of the rectangular block $A_2$ is set as the compared reference value $A_{k[2]av}$ to compare the compared reference value $A_{k[2]av}$ with the block luminance value of the rectangular block $A_5$.

Figure 5:
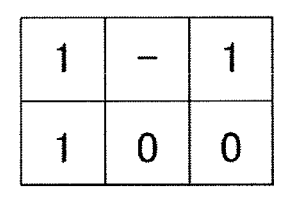
Figure 6:
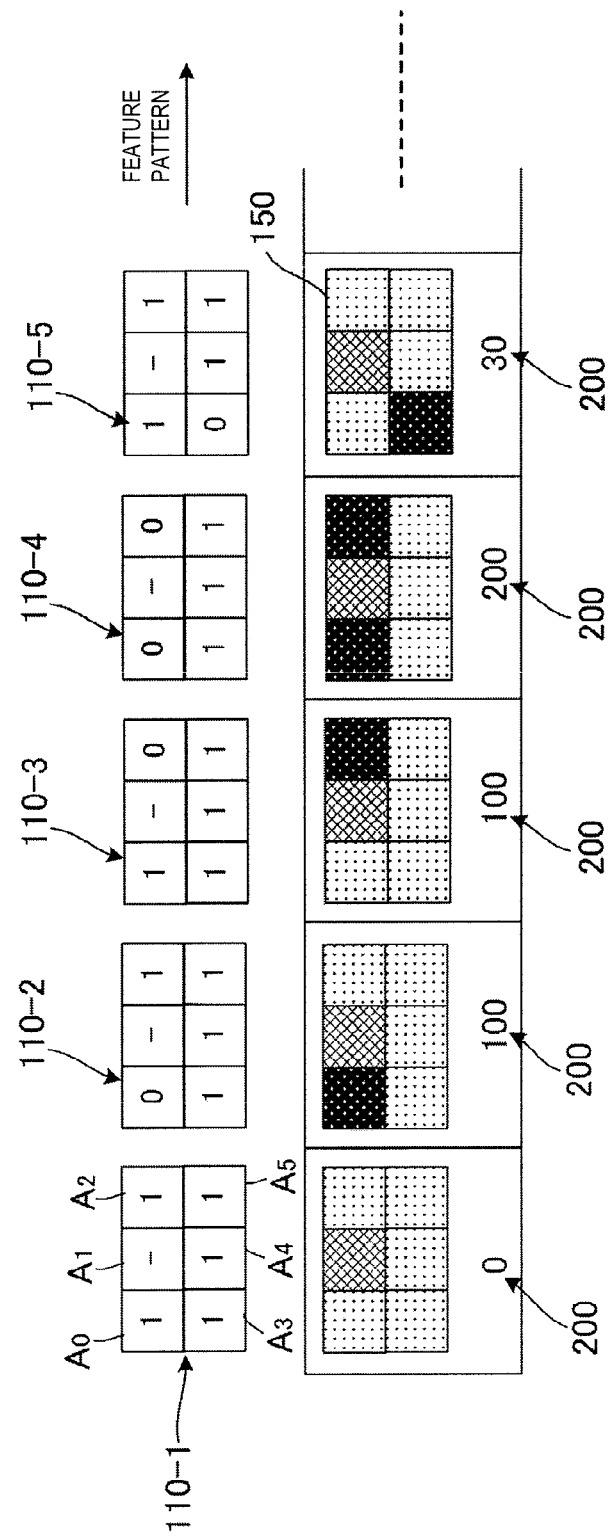
FIG. 6 is a diagram schematically showing feature patterns when the rectangular block $A_1$ is set as a compared reference value ($A_{ref}$) in the object determination device shown in FIG. 1.

FIG. 5 is a diagram showing one example of the feature pattern $P_i$ (i=0 to 5) when the block luminance value of the rectangular block $A_1$ is set as the compared reference value $A_{k[1]av}$ in the case of using the template 100. Further, FIG. 6 is a diagram schematically showing feature patterns when the rectangular block $A_1$ is set as a compared reference value ($A_{ref}$) in the template 100 set on an image example 150. When the rectangular block $A_1$ is set as the compared reference value ($A_{ref}$) to compare the compared reference value ($A_{ref}$) respectively with the block luminance values of other rectangular blocks $A_0$, $A_2$, $A_3$, $A_4$ and $A_5$, such feature patterns 110-1, 110-2, ..., as shown in FIG. 6 are obtained. Numbers (0, 100, ...) annexed adjacently to the templates 100 respectively show the scores 200. The comparison table of the feature patterns 110-1, 110-2, ..., and the scores 200 in FIG. 6 is the learned data stored in the learned data storage unit 15 in FIG. 1. In the templates respectively, the feature pattern showing more a part of the face has the higher score due to the Boosting learning. Further, in the six rectangular blocks $A_0$ to $A_5$ respectively forming the templates 100 in FIG. 6, when color is darker, a luminance is lower.

FIGS. 7(a) to 7(g) are diagrams showing the feature patterns when the block luminance value of the rectangular block $A_1$ is set as the compared reference value $A_{k[1]av}$ and one example of an average image of the feature pattern when the feature patterns are respectively summed to average them in the template 100. The feature pattern shown in FIG. 7(a) is a feature pattern that a position (X, Y) of the template is located in (3xkxm, 3xkxn) (m and n are integers, and k is a size of a rectangular block). The feature pattern shown in FIG. 7(b) is a feature pattern that a position (X, Y) of the template is located in (3xkxm+k, kxn). The feature pattern shown in FIG. 7(c) is a feature pattern that a position (X, Y) of the template is located in (3xkxm+2xk, kxn). The feature pattern shown in FIG. 7(d) is a feature pattern that a position (X, Y) of the template is located in (3xkxm, kxn+k). The feature pattern shown in FIG. 7(e) is a feature pattern that a position (X, Y) of the template is located in (3xkxm+k, kxn+k). The feature pattern shown in FIG. 7(f) is a feature pattern that a position (X, Y) of the template is located in (3xkxm+2xk, kxn+k). When the feature patterns of FIGS. 7(a) to 7(f) are respectively summed and averaged, the average image of the feature pattern shown in FIG. 7(g) is obtained.

Now, by referring to FIG. 8(a) to FIG. 11(e), features of the present invention will be described below.

(Feature [1])

FIG. 8(a) to FIG. 10 are diagrams for explaining a feature [1] of the present invention.

FIGS. 8(a) to 8(f) are diagrams showing one examples of average images of the feature patterns when the block luminance value of the rectangular block $A_i$ is set as the compared reference value $A_{k[i]av}$ (i=0 to 5) in the template 100. FIG. 8(a) shows the average image of the feature pattern when the block luminance value of the rectangular block $A_0$ is set as the compared reference value $A_{k[0]av}$. FIG. 8(b) shows the average image of the feature pattern when the block luminance value of the rectangular block $A_1$ is set as the compared reference value $A_{k[1]av}$. FIG. 8(c) shows the average image of the feature pattern when the block luminance value of the rectangular block $A_2$ is set as the compared reference value $A_{k[2]av}$. FIG. 8(d) shows the average image of the feature pattern when the block luminance value of the rectangular block $A_3$ is set as the compared reference value $A_{k[3]av}$. FIG. 8(e) shows the average image of the feature pattern when the block luminance value of the rectangular block $A_4$ is set as the compared reference value $A_{k[4]av}$. FIG. 8(f) shows the average image of the feature pattern when the block luminance value of the rectangular block $A_5$ is set as the compared reference value $A_{k[5]av}$. As shown in FIGS. 8(a) to 8(f), the feature patterns respectively have directions or fine edges (ends), so that it is recognized that features of face parts are much left.

Figure 9:
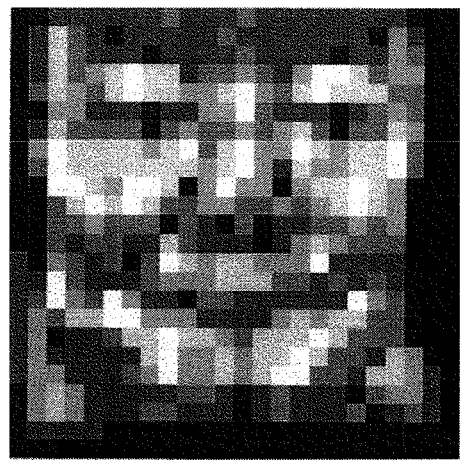
FIG. 9 is a diagram for explaining the feature [1] of the present invention and shows one example of the average image of the feature pattern.

FIG. 9 is a diagram showing one example of an average image of the feature pattern when the template 101 is used. When the rectangular blocks $A_0$ to $A_5$ are respectively mutually overlapped as in the template 101 shown in FIG. 3, finer edge information is included as shown in FIG. 9.

Figure 10:
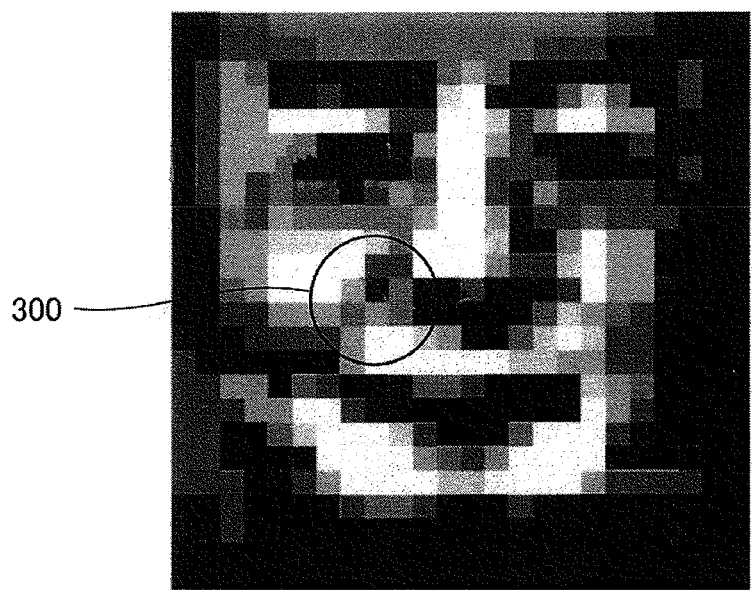
FIG. 10 is a diagram showing an average image of a feature pattern by the feature amount disclosed in Patent Document 1.
Figure 11:
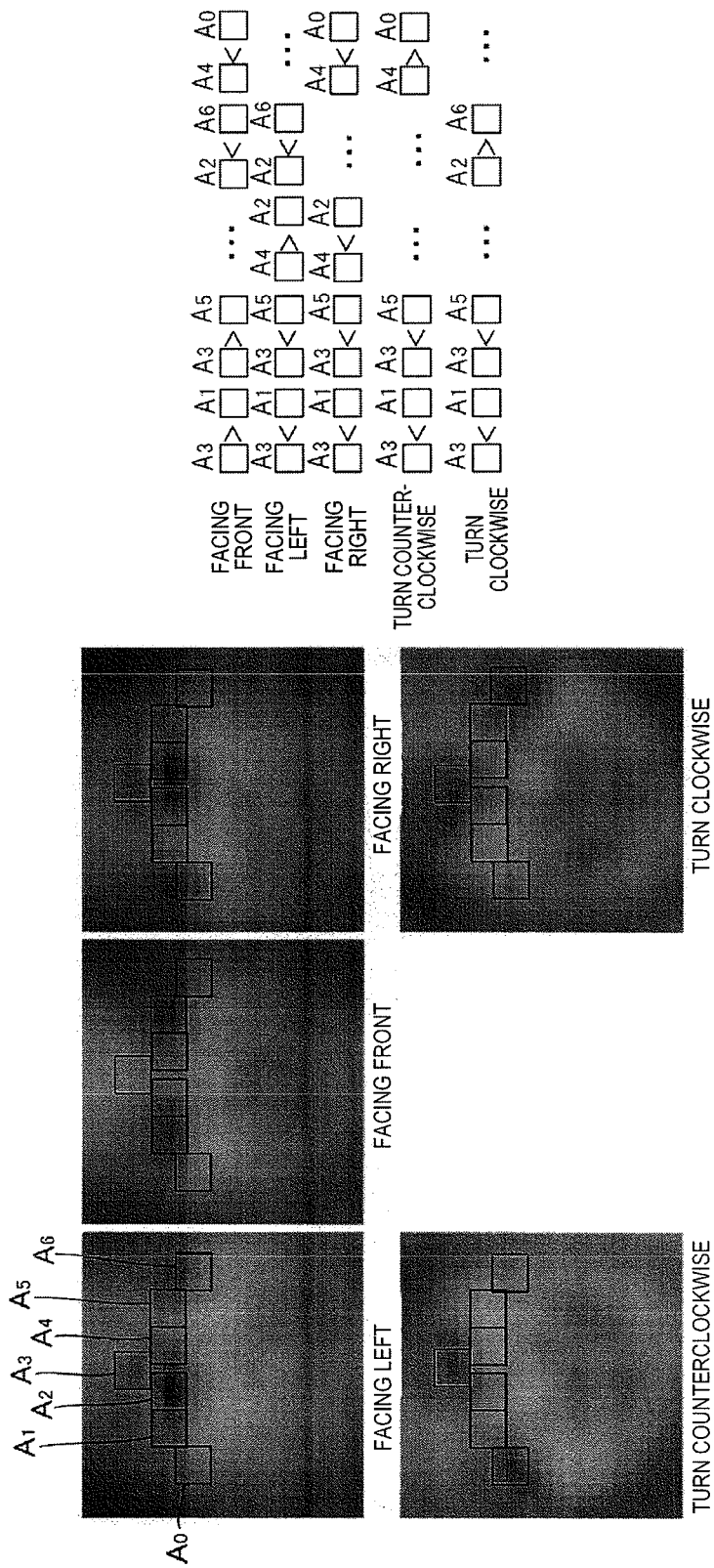
FIGS. 11(a) to 11(e) are diagrams for explaining a feature [2] of the present invention.

FIG. 10 is a diagram showing an average image of a feature pattern by the feature amount disclosed in Patent Document 1. When the average image of the feature pattern shown in FIG. 10 is compared with the average image of the feature pattern by the feature amount of the present invention shown in FIG. 7(g), it is recognized that the average image of the feature pattern by the feature amount of the present invention has nose outline information 300, however, the average image of the feature pattern by the feature amount disclosed in Patent Document 1 lacks the nose outline information 300. As described above, the present invention has the feature [1] that the edge information of the directions is respectively included in the feature amount.

(Feature [2])

FIGS. 11(a) to 11(e) are diagrams for explaining a feature [2] of the present invention. As shown in FIGS. 11(a) to 11(e), in the present invention, a face or a non-face can be determined with high possibility respectively to different directions of the face by a common template. FIG. 11(a) shows the face facing a left, FIG. 11(b) shows the face facing a front. FIG. 11(c) shows the face facing a right. FIG. 11(d) shows the face turning counterclockwise. FIG. 11(e) shows the face turning clockwise. To these directions of the faces, the rectangular blocks $A_0$ to $A_7$ having a common positional relation are set. Then, when below-described relations are established, the scores are set to be high. Otherwise, the scores are set to be low (the scores are set as described above by the learning such as the Boosting).

Facing the front: the luminance value of the rectangular block $A_3$>the luminance value of the rectangular block $A_1$, the luminance value of the rectangular block $A_3$>the luminance value of the rectangular block $A_5$, ..., the luminance value of the rectangular block $A_2$<the luminance value of the rectangular block $A_6$, the luminance value of the rectangular block $A_4$<the luminance value of the rectangular block $A_0$ Facing the left: the luminance value of the rectangular block $A_3$<the luminance value of the rectangular block $A_1$, the luminance value of the rectangular block $A_3$<the luminance value of the rectangular block $A_5$, the luminance value of the rectangular block $A_4$>the luminance value of the rectangular block $A_2$, the luminance value of the rectangular block $A_2$<the luminance value of the rectangular block $A_6$, ....

Facing the right: the luminance value of the rectangular block $A_3$<the luminance value of the rectangular block $A_1$, the luminance value of the rectangular block $A_3$<the luminance value of the rectangular block $A_5$, the luminance value of the rectangular block $A_4$<the luminance value of the rectangular block $A_2$, ..., the luminance value of the rectangular block $A_2$<the luminance value of the rectangular block $A_0$ Turning counterclockwise: the luminance value of the rectangular block $A_3$<the luminance value of the rectangular block $A_1$, the luminance value of the rectangular block $A_3$<the luminance value of the rectangular block $A_5$, ..., the luminance value of the rectangular block $A_4$>the luminance value of the rectangular block $A_0$ Turning clockwise: the luminance value of the rectangular block $A_3$<the luminance value of the rectangular block $A_1$, the luminance value of the rectangular block $A_3$<the luminance value of the rectangular block $A_5$, ..., the luminance value of the rectangular block $A_2$>the luminance value of the rectangular block $A_6$, ....

All the above-described conditions do not necessarily need to be satisfied. For instance, when a right eye is supposed to be shut, even if only the relation of the relative level between the luminance value of the rectangular block $A_3$ and the luminance value of the rectangular block $A_1$ is not satisfied in the face facing the front, the scores may be set to be high (when a face image having the right eye shut is added to the learning, the scores are set as described above by the learning such as the Boosting).

In an ordinary detection of the face, since the templates are different respectively for the different directions of the face, the feature amounts respectively for the directions of the face need to be calculated. In the present invention, since the common template is used respectively to the different directions of the face, the feature pattern as the feature amount to the different directions of the face can be efficiently generated at a time. In such a way, the present invention has the feature [2] that the face/non-face can be effectively separated by the feature pattern common respectively to the directions of the face.

Now, an operation of the object determination device 1 of the first exemplary embodiment will be described below.

Figure 12:
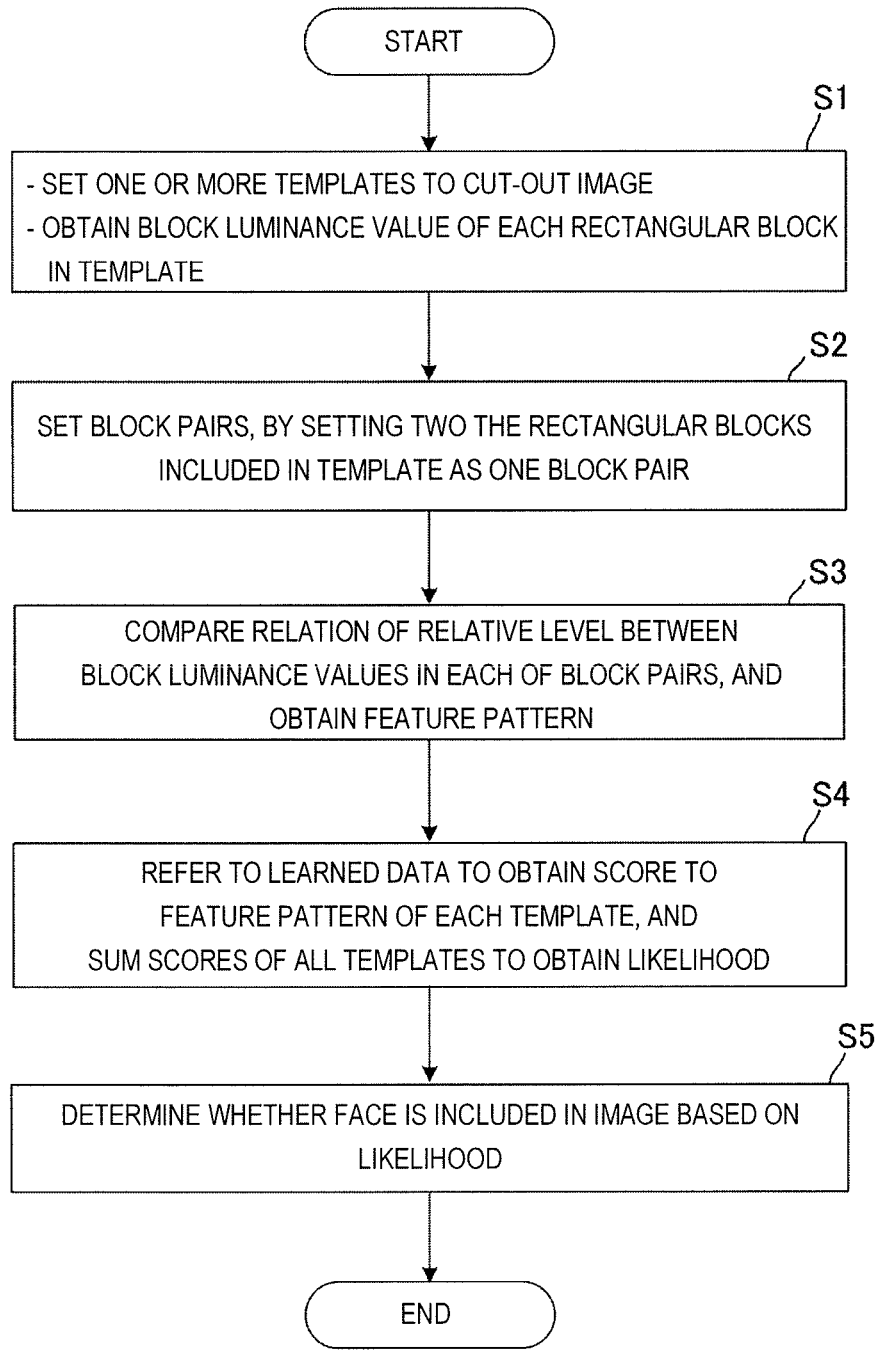
FIG. 12 is a flowchart for explaining an operation of the object determination device shown in FIG. 1.

FIG. 12 is a flowchart for explaining the operation of the object determination device 1 of the first exemplary embodiment. In FIG. 12, the block luminance calculating unit 131 initially sets one to the plurality of templates formed with the plurality of rectangular blocks on the image and calculates the average values (the block luminance values) of the luminance of the rectangular blocks respectively in the templates (step S1). Then, the block pair setting unit 132 sets the plurality of block pairs by setting any two of the rectangular blocks respectively included in the template as one pairs in each of the templates (step S2). Then, the comparing unit 133 obtains the feature pattern showing the relation of the relative level between the block luminance values in each of the plurality of block pairs set in the block pair setting unit 132 to hold the feature pattern in the feature amount holding unit 134 (step S3). Subsequently, the likelihood calculating unit 14 refers to the learned data storage unit 15 to obtain the scores to the feature patterns of the templates respectively and further sums the scores of all the templates to obtain the likelihood (step S4). Finally, the comparing unit 16 determines whether or not the face of the human being (or a part of the face such as the face parts) is included in the image in accordance with the likeliness (step S5).

As described above, according to the object determination device 1 of the first exemplary embodiment, the plurality of block pairs are set by setting any two of the plurality of rectangular blocks respectively included in the one template as one pairs. In accordance with the relation of the relative level between the block luminance values in each of the block pairs, is held the score showing a degree that a part of the object is included in the template. The above-described processes are carried out in all the templates to determine whether or not the object is included in the image in accordance with the sum of the scores of all the templates. Especially, in the present invention, since any one of the plurality of rectangular blocks included in the one template can be set as the compared reference value, the size of the area of the compared reference value is smaller (not excessively general) than that of the technique disclosed in Patent Document 1. Accordingly, when the object is, for instance, the face of the human being, the features of the parts of the face (the eyes, the nose, the mouth or the like) can be respectively largely left. Further, a hidden area is involved with low possibility. Thus, the object determination device of the first exemplary embodiment is also suitably applied to a detection of a partial feature and strong in a partial hiding.

As a hardware structure of the object determination device 1 of the first exemplary embodiment, an ordinary computer may be used. Namely, the object determination device 1 can be formed with a volatile memory such as a CPU, a RAM, etc., and a nonvolatile memory such as a ROM, etc. and a computer provided with a mass storage device such as a hard disk or an SSD (Solid State Drive).

Further, a program which describes processes in the object determination device 1 of the first exemplary embodiment may be stored and distributed in a storage medium such as a magnetic disk, an optical disk, a photo-electro magnetic disk, a semiconductor memory.

Further, in the present exemplary embodiment, the blocks in the templates respectively have rectangular forms. However, it is to be understood that when the blocks are triangular, polygonal or circular, the same effects can be obtained.

Second Exemplary Embodiment

In the object determination device 1 of the above-described first exemplary embodiment, the feature amount has only the feature pattern $P_i$, however, in an object determination device 1A (see FIG. 1) of a second exemplary embodiment, a feature amount has a set of a feature pattern and a value (this value is referred to as an "intensity") showing a difference of brightness to a compared reference value ($A_{ref}$). The feature amount including the intensity is generated in a feature amount generating unit 13A (see FIG. 1). The intensity showing the difference of brightness designates a value showing amplitude (namely, a difference between a bright rectangular block $A_n$ and a dark rectangular block $A_n$) between the bright rectangular block ($A_n < A_{ref}$) and the dark rectangular block ($A_n > A_{ref}$) relative to the brightness of the rectangular block of the compared reference value ($A_{ref}$). Thus, the intensity K takes a small value when a luminance variation is small, and takes a large value when the luminance variation is large to show the intensities of edges respectively in boundaries of an eye, a mouth, and a nose. When the feature pattern is taken as a spatial frequency, the intensity is taken as amplitude thereof.

When there are six rectangular blocks, the intensity K is obtained in such a manner as described below. Here, "av" indicates an average value.

Figure 13A:
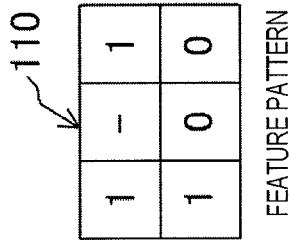
FIGS. 13(a) to 13(c) are diagrams schematically showing processes for obtaining a feature amount when intensity is included in an object determination device according to a second exemplary embodiment of the present invention.
Figure 13B:
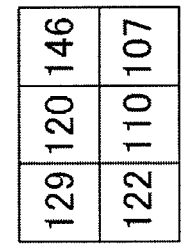
Figure 13C:
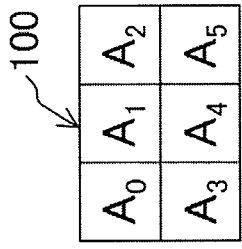

$D_i=1$ ($A_{iav} < A_{k[i]av}$) i=0 to 5
$D_i=0$ ($A_{iav} \geq A_{k[i]av}$) i=0 to 5
$B_i=0$ ($A_{iav} < A_{k[i]av}$) i=0 to 5
$B_i=1$ ($A_{iav} \geq A_{k[i]av}$) i=0 to 5
$K=(\Sigma B_i \times A_{iav})/\Sigma B_i - (\Sigma D_i \times A_{iav})/\Sigma D_i$ FIGS. 13(a) to 13(c) are diagrams schematically showing processes for obtaining the feature amount when the intensity is included. FIG. 13(a) shows a template 100 formed with the six rectangular blocks $A_0$ to $A_5$ like the template shown in FIG. 3(a). In the template 100, as shown in FIG. 13(b), when a luminance value of the rectangular block $A_0$ is set to "129", a luminance value of the rectangular block $A_1$ is set to "120", a luminance value of the rectangular block $A_2$ is set to "146", a luminance value of the rectangular block $A_3$ is set to "122", a luminance value of the rectangular block $A_4$ is set to "110", a luminance value of the rectangular block $A_5$ is set to "107", and the rectangular block $A_1$ is set as the compared reference value ($A_{ref}$) to pattern them, the feature pattern 110 as shown in FIG. 13(c) is obtained. Namely, in a comparison between the luminance value "129" of the rectangular block $A_0$ and the compared reference value ($A_{ref}$) "120", since 129>120, "1" is obtained. Further, in a comparison between the luminance value "146" of the rectangular block $A_2$ and the compared reference value ($A_{ref}$) "120", since 146>120, "1" is obtained. Further, in a comparison between the luminance value "122" of the rectangular block $A_3$ and the compared reference value ($A_{ref}$) "120", since 122>120, "1" is obtained. Further, in a comparison between the luminance value "110" of the rectangular block $A_4$ and the compared reference value ($A_{ref}$) "120", since 110<120, "0" is obtained. Further, in a comparison between the luminance value "107" of the rectangular block $A_5$ and the compared reference value ($A_{ref}$) "120", since 107<120, "0" is obtained.

From the feature pattern 110 obtained in such a way, an average of the bright rectangular blocks and an average of the dark rectangular blocks are respectively obtained. The average of the bright rectangular blocks is (129+146+122)/3≈132.23 in accordance with the luminance values of the rectangular blocks the feature amounts of which are 1. Further, the average of the dark rectangular blocks is (110+107)/2=108.5 in accordance with the luminance values of the rectangular blocks the feature amounts of which are 0. Then, the intensity is the average value of the luminance of the bright rectangular blocks—the average value of the luminance of the dark rectangular blocks≈23.833. The set of the intensity (23.833) and the feature pattern 110 forms the feature amount. In such a way, the feature amount having an edge intensity improved can be obtained. When the feature amount is used, a performance for detecting the face can be improved.

Figure 14:
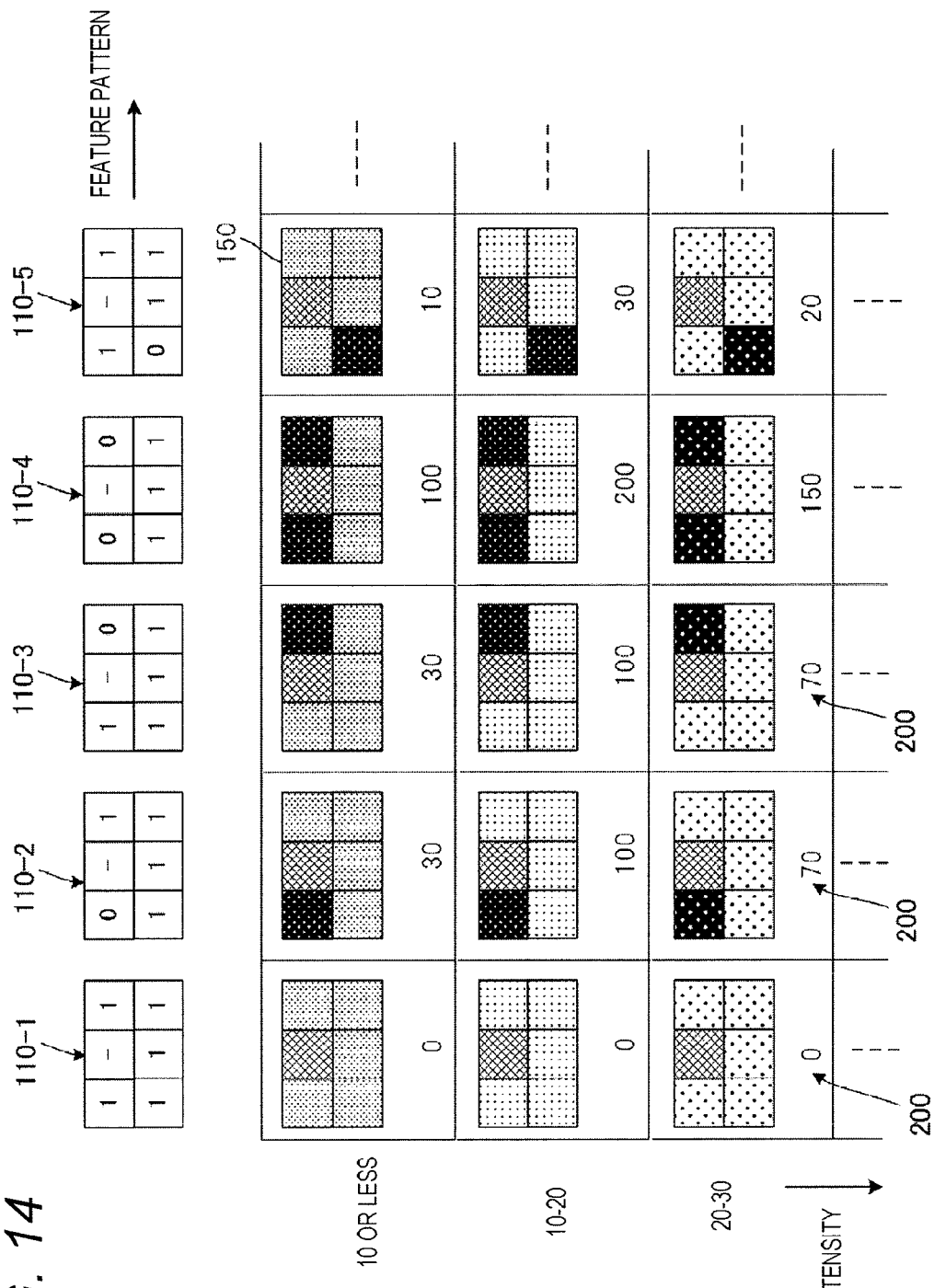
FIG. 14 is a diagram schematically showing feature patterns when a rectangular block $A_1$ is set as a compared reference value ($A_{ref}$) in the object determination device according to the second exemplary embodiment of the present invention.

FIG. 14 is a diagram schematically showing feature patterns when the rectangular block $A_1$ is set as the compared reference value ($A_{ref}$) in the template 100 set on an image example 150. When the rectangular block $A_1$ is set as the compared reference value ($A_{ref}$) to compare the compared reference value ($A_{ref}$) respectively with the luminance values of other rectangular blocks $A_0, A_2, A_3, A_4$ and $A_5$, such feature patterns 110-1, 110-2, . . . as shown in FIG. 14 are obtained. Numbers (0, 30, 70, 100, . . . ) annexed adjacently to the templates 100 respectively show scores 200. A comparison table of the feature patterns 110-1, 110-2, . . . , the intensities and the scores 200 in FIG. 14 is learned data stored in the learned data storage unit 15 in FIG. 1 as in the first exemplary embodiment. Further, in the six rectangular blocks $A_0$ to $A_5$ respectively forming the templates 100, when color is darker, a luminance is lower.

Figure 15:
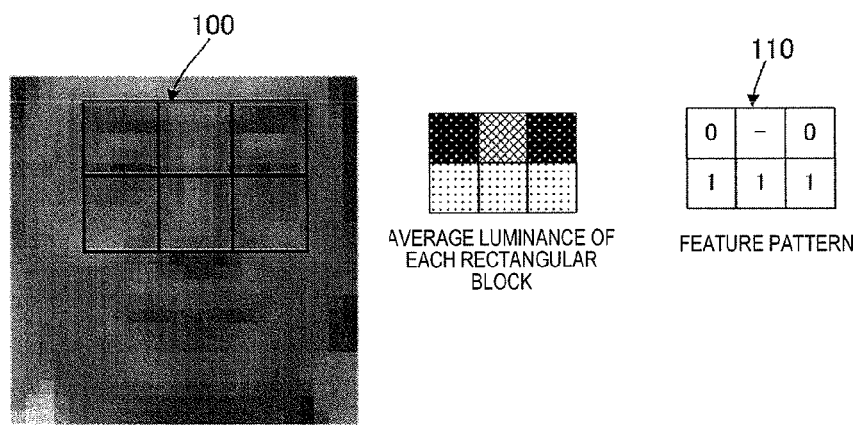
FIG. 15 is a diagram showing average luminance of rectangular blocks $A_0$, $A_2$, $A_3$, $A_4$ and $A_5$ respectively and a feature pattern when the rectangular block $A_1$ is set as the compared reference value ($A_{ref}$) in the object determination device according to the second exemplary embodiment of the present invention.

FIG. 15 is a diagram showing average luminance of the rectangular blocks $A_0, A_2, A_3, A_4$ and $A_5$ respectively and a feature pattern 110 when the template 100 is set in a position of the face of a human being including a nose on an image and the rectangular block $A_1$ is set as the compared reference value ($A_{ref}$). As shown in FIG. 15, since parts of both eyes of the image of the human being are darker than a part between both the eyes, and the nose and both side parts of the nose as a center are brighter than the part between both the eyes, such a feature pattern 110 as shown in FIG. 15 is obtained. A luminance variation is large in both the eyes and parts located just below both the eyes.

As described above, since the object determination device 1A of the second exemplary embodiment has the feature amount including the edge intensity, the performance for detecting the face is improved.

In the object determination device 1A of the second exemplary embodiment, the intensity may be the value showing the difference of brightness, and may be a difference between maximum values of the bright rectangular blocks and the dark rectangular blocks. Further, the above-described intensity is a continuous value, however, the intensity may be quantized in the stages of N. A quantized width may be a fixed value and a value based on a variance calculated respectively from the values of the rectangular blocks.

Further, in the object determination device 1A of the second exemplary embodiment, as a hardware structure, an ordinary computer may be used like the object determination device 1 of the first exemplary embodiment.

Further, in the object determination device 1A of the second exemplary embodiment, a program which describes processes may be stored and distributed in a storage medium such as a magnetic disk, an optical disk, a photo-electro magnetic disk, a semiconductor memory or the like.

The present invention is described in detail by referring to the specific exemplary embodiments, however, it is to be understood to a person with ordinary skill in the art that the present invention may be variously changed or modified without departing from the spirit and scope of the present invention.

This application is based on Japanese Patent Application (Application No. 2011-053201) filed on Mar. 10, 2011 and contents thereof are incorporated herein as a reference.

INDUSTRIAL APPLICABILITY

The present invention has effects that the compared reference value is not excessively global, the features of parts of the face (the eyes, the nose, the mouth or the like) can be respectively largely left when the object is, for instance, the face of a human being and a hidden area is involved with low possibility, and may be applied to a monitor camera.

DESCRIPTION OF REFERENCE SIGNS 1, 1A: Object Determination Device
10: Input Unit
11: Reduction and Enlargement Unit
12: Image Window Cut-Out Unit
13, 13A: Feature Amount Generating Unit
14: Likelihood Calculating Unit
15: Learned Data Storage Unit
16: Comparing Unit
100, 101, 102: Template
110-1 to 110-5: Feature Pattern
131: Block Luminance Calculating Unit
132: Block Pair Setting Unit
133: Comparing Unit
134: Feature Amount Holding Unit
150: Image Example
200: Score
300: Nose Outline Information
$A_0, A_1, A_2, A_3, A_4, A_5$: Rectangular Block

The invention claimed is:

1. An object determination device comprising:
a block luminance calculating unit which sets one or more templates including a plurality of rectangular blocks on an image, and which obtains an average value of luminance of each of the rectangular blocks contained in each template as a block luminance value;
a block pair setting unit which sets a plurality of block pairs, by setting two of the rectangular blocks contained in each template as one block pair;
a comparing unit which obtains a relation of a relative level between the block luminance values in each of the block pairs; and
a score holding unit which holds, for each template, a score showing a degree to which a part of an object is included in the template based on the relation of the relative level between the block luminance values in each of the block pairs set in the template, wherein based on the relation of the relative level between the block luminance values of each of the block pairs in each template, by referring to the score holding unit, a sum of the scores of all the templates is obtained, and whether the object is included in the image is determined based on the sum.

2. The object determination device according to claim 1, wherein the rectangular blocks are overlapped with each other.

3. The object determination device according to claim 1, wherein the rectangular blocks contact each other.

\* \* \* \* \*